United States Patent Office 3,558,286
Patented Jan. 26, 1971

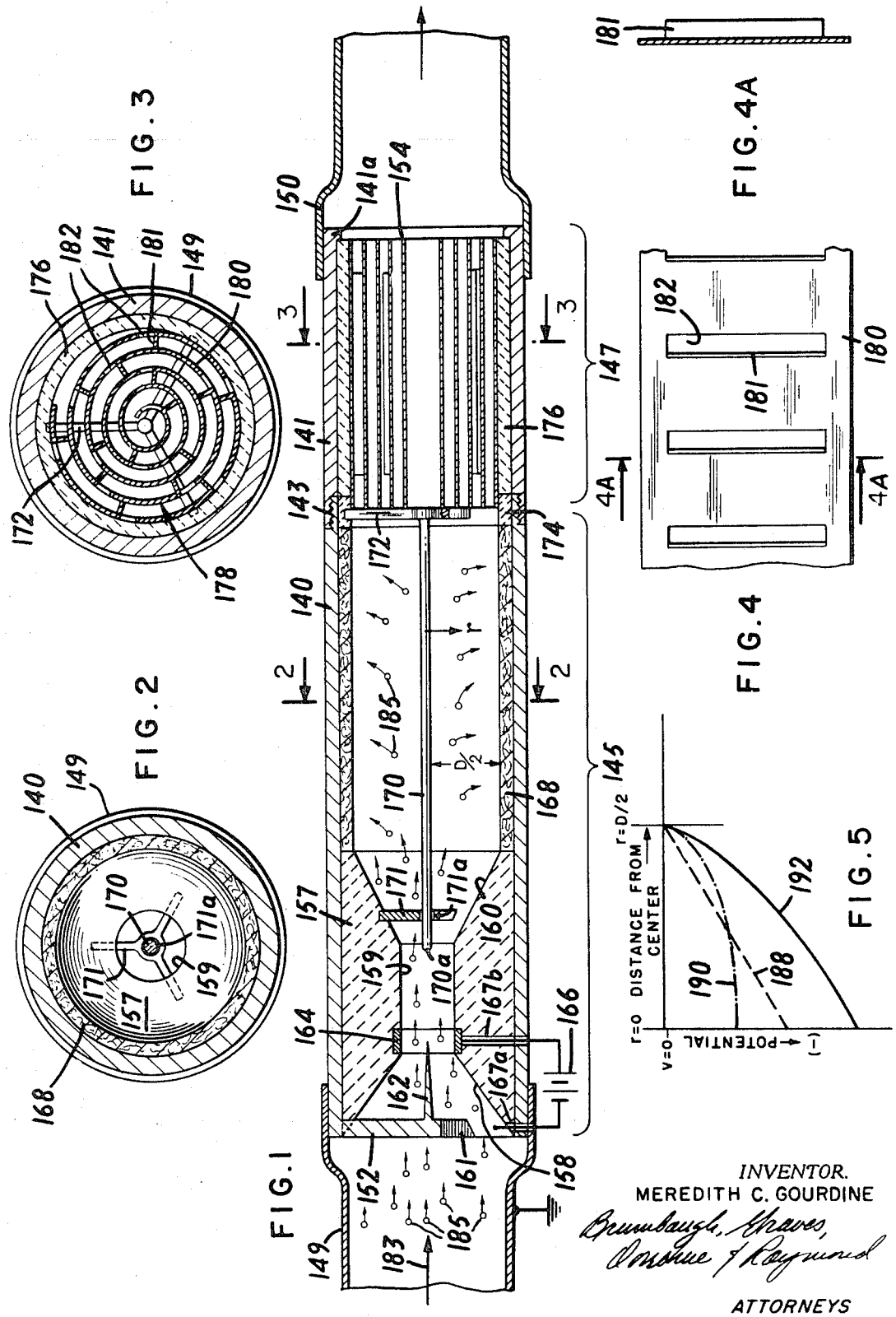

3,558,286
ELECTROGASDYNAMIC PRECIPITATOR WITH CATALYTIC REACTION
Meredith C. Gourdine, West Orange, N.J., assignor to Gourdine Systems, Incorporated, Livingston, N.J., a corporation of Delaware
Original application June 16, 1967, Ser. No. 655,977.
Divided and this application Jan. 13, 1969, Ser. No. 790,570
Int. Cl. B03c *3/45;* F01n *3/00, 3/14*
U.S. Cl. 23—288                                      4 Claims

ABSTRACT OF THE DISCLOSURE

Methods and apparatus for ridding undesired gaseous components and entrained particles from an exhaust flow, in which gaseous flow received from an electrogasdynamic particle-removing precipitator is contacted with a catalyst to bring about a reaction between the gaseous components. The precipitator includes corona discharge electrodes for creating a discharge to charge the particles electrically, an intermediate dielectric conduit and a larger conductive porous tubular collector for trapping the charged particles precipitated by space charge field or by an applied electric field between the tubular collector electrode and a central passive electrode. Thereafter the gas flow is contacted with a conductive catalyst assembly in the form of a coiled ribbon to react the gaseous components.

CROSS REFERENCE TO RELATED APPLICATIONS

This application is a division of Ser. No. 655,977, filed June 16, 1967, for "Precipitator Systems," now abandoned. This application is also related to Ser. No. 788,757, filed Jan. 3, 1969, for "Electrogasdynamic Precipitator Systems," a division of Ser. No. 655,977, and to copending application Ser. No. 601,270, filed Nov. 15, 1966, for "Electrogasdynamic Systems and Methods," now abandoned.

BACKGROUND OF THE INVENTION

This invention relates to improved methods and apparatus for ridding particle-containing exhaust flow of undesired gaseous components, particularly to those methods and apparatus in which an electrogasdynamic precipitator is employed to remove particles from the flow prior to reaction of the gaseous components to form new unobjectional gaseous products.

Contact catalysts are ideally suited to the removal of toxic gaseous components (e.g., carbon monoxide) of the combustion gases found in a vehicle engine exhaust. Most fuels burned in vehicle engines, however, never approach complete combustion when ignited, producing as byproducts minute solid hydrocarbon particles in the exhaust gases, which contaminate and deactivate the catalyst material to destroy its effectiveness as an antipollution measure. Additionally, many gasolines contain additives such as tetraethyl lead which, upon combustion in the engine, leave lead compounds in the form of particles that are free to deposit on the surface of the catalyst material to further aggravate the problem of catalyst contamination. Known catalyst materials, therefore, acting alone, are unsatisfactory for cleansing vehicle exhaust gases because of their short lifetimes and frequent need for replacement or reconditioning.

In my copending application Ser. No. 601,270, there is disclosed a system for reacting components of a flowing combustion gas with catalytic particles which are injected into the flowing stream. These particles, after promoting oxidation of gaseous components of the flow, are precipitated from the stream by an EGD precipitator and then recirculated for reinjection. The system disclosed in that application is very satisfactory and offers distinct advantages in industrial applications where large mass flows are encountered. In my abandoned application Ser. No. 655,977, filed June 6, 1967, for "Precipitator Systems," there is depicted an engine exhaust flow cleansing device having an electrogasdynamic precipitator. The present apparatus and methods on the other hand, are particularly suitable for use in flowing gaseous systems of lower mass flow rates and offer the utmost in safety, simplicity of design, and low-cost maintenance and construction. These advantages make the apparatus ideal for use in the exhaust of an internal combustion automobile engine, for example, where both precipitate and gaseous matter must be either removed or otherwise treated in order to prevent pollutants from entering the atmosphere.

SUMMARY OF THE INVENTION

In accordance with the present invention, a catalyst material bed (preferably fixed) is combined with and disposed downstream of an electrogasdynamic precipitator which removes catalyst-contaminating particles from the exhaust prior to the catalytic oxidation process. The combustion gas exiting to the atmosphere is therefore free from both solid pollutants and toxic gaseous components. The catalyst bed itself may be a removable element of the apparatus should the need for replacement ever arise, and may cooperate with the precipitator for establishing the desired electrical field effects.

BRIEF DESCRIPTION OF THE DRAWINGS

A better understanding of the invention may be gained from the following detailed description, taken in conjunction with the accompanying drawings, in which:

FIG. 1 is an elevational view in cross section of a device according to the invention incorporating an electrogasdynamic precipitator and contact catalyst assembly, for both removing undesired particles from a fluid flow and promoting combustion of incompletely oxidized gaseous components;

FIGS. 2 and 3 are cross-sectional views of the device taken along the lines 2—2 and 3—3 in FIG. 1, respectively;

FIG. 4 is a partial plan view of a strip of catalyst material suitable for use in the FIG. 1 device;

FIG. 4A is a cross-sectional view along the line A—A in FIG. 4; and

FIG. 5 is a graph depicting the electric fields in the collector portion of the precipitator incorporated in the FIG. 1 device.

DESCRIPTION OF PREFERRED EMBODIMENT

FIGS. 1–3 depict a representative embodiment of an engine exhaust flow cleansing device consisting primarily of an electrogasdynamic (EGD) precipitator of the type shown in my application Ser. No. 655,977 for "Precipitator Systems," now abandoned, combined with a catalytic reaction stage, or catalytic afterburner, for promoting combustion of unburned or incompletely burned fuel in the exhaust flow.

Referring to FIG. 1, the active portions of the electrogasdynamic (EGD) precipitator-catalyst device are housed in a cylindrical metal tube comprised of a forward section 140 and mating after-section 141, both including a threaded portion 143 so that the sections may be separated from one another. The forward section 140 encloses the EGD precipitating portion of the device bracketed at 145, whereas the after-section 141, which includes an annular flange 141a at its downstream end, houses a fixed catalyst bed assembly 147 for promoting combustion of the unburned and incompletely burned fuel and other components of the combustion gas to be cleansed. For purposes of explanation, it will be assumed that the whole unit comprises an element of an automobile exhaust system of which a portion (for example, the exhaust manifold or tailpipe) is represented by the pipes 149 and 150 at the inlet and outlet ends 152, 154 of the device, respectively.

At the upstream end of the device comprising the precipitator 145 is a dielectric nozzle section 157 defining a convergent, gas-accelerating passage 158, a throat 159, and a divergent gas-decelerating passage 160. Supported in the dielectric section 157 by a radial arm array 161 similar to that disclosed in my application Ser. No. 655,977, noted above, is a needle corona electrode 162 of which the sharp end extends into the throat 159. An annular concentric attractor electrode 164 surrounds the end of the needle electrode to establish a transverse ionizing (discharge) field in the throat upon connection of an ionizing field source, here represented by the battery 166. That field charges the particles entrained in the flow passing through the throat 159.

In a pracical embodiment the voltage of the source 166 may approximate 4–5 kv., which can be easily derived from a conventional inverter circuit powered from a 6 or 12 volt automobile battery. Connections to the electrodes are made through the small apertures 167a, 167b in the tube 140 and section 157. Electrodes 162 and 164 may be metal, but their fabrication from conducting ceramic materials is preferred because of the resistance of such materials to corrosive environments and their ability to withstand temperature extremes. Examples of suitable conducting ceramics for this purpose are the metal carbides and oxides, such as tin oxide. The section 157, on the othei hand, should be primarily a good insulator, such as non-conducting ceramic "Stycast" or glass.

Downstream of the section 157 is a removable porous sleeve 168, which may be a copper wire mesh, in electrical contact with the metal tube 140 and forming a collector electrode to which the particles to be precipitated from the flow path are driven by the transverse, or radial, electrical field downstream the nozzle section 157. Preferably, the collector electrode 168 is substantially larger than the total longitudinal dimension of the dielectric portions 159 and 160, located between the electrode 164 and the upstream end of the screen 168. Located centrally within the sleeve 168 is a passive electrical conductor in the form of a metal rod 170 supported at its upstream end by the radial arm spider 171 receiving the rod through an aperture 171a. At the downstream end of the precipitator 145, the rod 170 is rigidly supported by a similar spider 172 carried by an annular dielectric ring 174 slidably received in the tube 140. The rod 170 extends the full length of the precipitator collector insert 168 and into the nozzle section 157 so that the tip 170a is located in the throat 159. As will be more fully explained shortly, the passive rod 170 becomes charged by charged particles contacting it and acquires a high potential. The voltage on the passave central conductor 170 therefore sets up an auxiliary radial field between it and the conductive collector insert 158, which is referenced at the ground potential of the tubes 140, 141 and pipes 149 and 150.

The catalytic afterburner assembly 147 includes a removable cylindrical dielectric sleeve 176 fixedly supporting a coil matrix of catalyst material 178. The coil matrix 178 may be formed by coiling or winding about itself a ribbon 180 of suitable flexible catalyst material, such as platinum, of the form shown in FIGS. 4 and 4A. As seen there, projecting ribs 181 are formed on the thin strip 180 of catalyst material by punching or otherwise stamping elongated slots 182 in the strip. Alternately, of course, a flexible strip of substrate coated with the catalytic material, e.g., vanadium pentoxide, may be used in place of a solid catalyst. The ribs 181 form spacers between adjacent convolutions of the coil when the catalyst matrix is assembled, as best seen in FIG. 3, and the apertures or slots 182 permit the free transfer of flowing gases from one annular space to the next between the convolutions.

When the unit is assembled, the conductive ribbon catalyst matrix in the apparatus of FIG. 1 is held in electrical contact with the radially extending arms 172 by the flange 141a bearing against the sleeve 176. With this arrangement, the catalyst matrix 178 assumes the potential of the metal rod 170 to set up an axial ion-repelling field between the catalytic afterburner 147 and the charged particles in the flow path. While a preferred form of catalytic matrix has been illustrated and described, other forms of catalyst assemblies presenting a sufficient surface area to the gas flow may be used. For example, the catalyst assembly may comprise a multitude of smaller perforated tubes constructed from or coated with a catalyst material and similarly supported in the dielectric sleeve 176. The catalyst assembly 147 may be removed and replaced merely by unscrewing the tubular section 141 and removing the dielectric sleeve 176 together with the catalyst matrix 178. At the same time, the rod 170 and associated dielectric supporting ring 174 can be removed and inspected for cleaning or replacement, if necessary. If the catalyst material has been degraded through long use, a new sleeve and catalyst matrix may then be inserted into the tube section 141 and the unit reassembled.

The operation of the combined precipitator and catalytic afterburner may be explained as follows. Combustion exhaust gases from an automobile engine, for example, enter the device through the pipe 149 in the direction shown by the arrow 183 and pass into the corona discharge field between the corona and attractor electrodes 152, 154 between which is impressed an ionizing voltage from the source 166. At this point lead compounds, solid hydrocarbon and other particulate matter 185 dispersed in the gas flow acquires a charge (negative, in the case illustrated), thereafter continuing downstream into the EGD generator section comprising the remaining downstream portion of the section 157. The potential energy of the particles is there raised to the total electric potential at the interior of the porous collector electrode 158. In passing through the nozzle section 157, however, some of the particles strike the tip 170a of the rod, transferring their charges to the rod. For this reason, the tip 170a of the rod extends into the constricted portion (throat) of the dielectric section 157 where the charge concentration (coulombs/m.$^3$) is maximum. As charged particles continue to transfer charges to the rod 170, the rod potential gradually builds up to a value limited by the minimum breakdown potential of the gaseous or other mediums between the metal parts of the rod and the tube sections 140 and 141, or by leakage of excess charges from the rod 170 either through corona discharge phenomenon or through a high resistance electrical path through the dielectric components of the device.

It may be mentioned here that a high resistance (now shown) may be deliberately inserted between the metal rod 170 and the conductive metal tube 140 such that the rate of leakage of charges and, consequently, the potential on the rod may be controlled. In any event, the uniform potential about the rod sets up a radial electric field having a gradient tending to drive the particles toward the collector electrode sleeve 158. This field is shown graphically in FIG. 5 by the straight line gradient 188. Superimposed on that linear electric field gradient is the space charge field gradient developed in the collector section by the presence of a great number of electrically charged particles. That gradient is shown qualitatively by the curve 190 in FIG. 5. The sum of the linear field gradient 188 and the space charge field gradient 190 represents the total transverse electric field at any given axial distance in the collector section of the precipitator, and is shown by the solid line curve 192 in FIG. 5. It is seen, therefore, that the passive conductive rod 170 supplements the space charge field in the precipitator and increases the probability that all of the particles will be precipitated from the flow path.

Under the influence of the electric field 192, the particles 185, i.e., the condensed phase of the system flow, are forced to the inner surface of the collector mesh 168, where they are entrapped.

Passing further downstream, the flow (now largely devoid of the dispersed condensed phase) enters the catalyst afterburner section 147 where it comes into contact with the catalyst matrix assembly 178 which presents a very large surface area to the gas. As the components of the gas flow are contacted by the large catalyst surface area presented by the spiraled platinum ribbon 180, readily oxidizable gaseous components undergo a reaction (e.g., further combustion) in which they are converted into harmless or less pollutant products which exit into the pipe 150 for passage into the atmosphere. In this connection, it should be remarked that, depending on the nature of the undesired gases in the flow, catalytic reduction accompanied by the release of other gaseous components may also be satisfactorily carried out in the catalytic afterburner. In particular circumstances, it is foreseeable that both catalytic oxidation and such deduction may be used to advantage, again depending on the flow conditions (e.g., temperature) and nature of the gases to be reacted.

From the foregoing description, it is appreciated that the apparatus shown in FIGS. 1–4A offers the advantages of both the catalytic afterburning process and the efficiency and simplicity of EGD precipitation for removing particulate pollutants and catalyst contaminants from the combustion gas. The device can be powered from any conventional battery source, as mentioned above, and has a relatively long life which may be even further increased through infrequent replacement of the catalyst assembly, if necessary. Moreover, its simplicity and reliability render it adaptable to installation directly in the exhaust manifold of an internal combustion engine, where the high temperature of operation may be utilized to promote more complete oxidation of the incompletely converted combustion byproducts.

The embodiments of the invention described above are representative only. It is understood that many modifications and variations may be made by one skilled in the art without departing from the spirit and scope of the invention. All such modifications and variations, therefore, are intended to be included within the scope of the appended claims.

I claim:

1. Apparatus for ridding undesired gaseous components and entrained particles from an exhaust flow comprising, in combination:
   a dielectric conduit defining a path for the flow;
   charging electrode means located in the conduit for imparting an electrical charge to the entrained particles;
   a porous conductive tubular electrode downstream of the dielectric conduit providing a collecting surface for the charged particles;
   a contact catalytic matrix exposed to the flow downstream of the tubular electrode and extending laterally into the central region of the flow for contacting the gaseous components to bring about a reaction therebetween; and
   a conductive rod electrode in said tubular electrode extending axially upstream of the flow from the catalytic matrix, said catalytic matrix being conductive and electrically insulated from the tubular electrode by a dielectric member to set up an axial ion-repelling field between the catalytic matrix and the charged entrained particles in the flow path.

2. Apparatus as defined in claim 1 further comprising: a tubular conductive housing encasing the dielectric conduit, tubular electrode and catalytic matrix.

3. In combination with the exhaust conduit carrying the exhaust flow from a combustion engine, apparatus for ridding the flow of undesired oxidizable gaseous components and particles entrained therein, comprising:
   means forming an integral part of the exhaust conduit and defining a flow path for the exhaust flow;
   electrode means for establishing in the flow path an electrical discharge field for charging the undesired particles entrained in the fluid, thereby to establish a space-charge field having a component normal to the direction of flow downstream of the discharge field;
   dielectric means downstream of the electrode means for establishing in the flow path, an axial charge-repelling field to increase the potential of the charged particles moving downstream therein;
   collector means providing a surface defining a flow path boundary downstream of the dielectric means for collecting the particles moving thereto at least partially under the influence of the space-charge field;
   conductive means disposed in the flow path to be charged by the transfer of charges thereto from the charged particles for establishing an electric field gradient having a component normal to the direction of flow and thereby providing a force directing the charged particles to the collector means surface, said conductive means being electrically isolated from the electrode and collector means and having a conductor disposed in and extending axially of the flow path and being at least partially coextensive with the axial charge-repelling field; and
   means downstream of the collector means for promoting combustion of the oxidizable gaseous components in the exhaust flow, said conductive means being in electrical contact with said means downstream of the collector means for promoting combustion of the oxidizable gaseous components to set up an axial ion-repelling field therebetween.

4. In apparatus for ridding undesired gaseous components and entrained particles from the exhaust flow of a combustion engine, the combination therewith of:
   means for subjecting the exhaust gas flow to an electrical discharge field to charge the particles carried therein;
   conduit means defining a flow path boundary downstream of the electrical discharge field for collecting the charged particles moving to the boundary and having a passive axial conductor disposed in said collecting conduit means to establish an electrical field gradient having a component in the collecting conduit means normal to the exhaust gas flow; and
   means downstream of the collecting conduit means for contacting the gaseous components with a catalyst to bring about a reaction therebetween, said catalyst material being conductive and in electrical contact with the passive axial conductor.

References Cited

UNITED STATES PATENTS

| | | | |
|---|---|---|---|
| 1,284,167 | 11/1918 | Welch | 23—176 |
| 1,756,987 | 4/1930 | Bilsky | 23—288.3FUX |
| 3,157,479 | 11/1964 | Boles | 55—154X |
| 3,208,131 | 9/1965 | Ruff et al. | 23—288.3FX |
| 3,400,513 | 9/1968 | Boll | 55—103 |
| 3,431,411 | 3/1969 | Harrick | 55—154X |

JOSEPH SCOVRONEK, Primary Examiner

U.S. Cl. X.R.

23—2; 55—138, 139, 146, 152, 154, 385; 204—312; 310—10